United States Patent [19]

Schenk

[11] 3,963,361

[45] June 15, 1976

[54] SHAFT ATTACHMENT ASSEMBLY

[75] Inventor: Peter Schenk, West Islip, N.Y.

[73] Assignee: Dzus Fastener Co., Inc., West Islip, N.Y.

[22] Filed: June 18, 1974

[21] Appl. No.: 480,530

[52] U.S. Cl............................ 403/255; 403/349; 301/111
[51] Int. Cl.² ...................... F16D 1/06; B60B 37/00
[58] Field of Search .......... 403/323, 349, 348, 260, 403/258, 254, 255, 253, 247, 230, 315, 263; 85/5 P; 24/221 K, 221 L, 221 R, 221 A; 301/111, 118

[56] References Cited
UNITED STATES PATENTS

| | | | |
|---|---|---|---|
| 2,187,426 | 1/1940 | Kuhnel............................... | 24/221 K |
| 2,356,162 | 8/1944 | Johnson et al..................... | 24/221 A |
| 2,378,122 | 6/1945 | Barlow.............................. | 24/221 K |
| 2,601,213 | 6/1952 | Poupitch.......................... | 24/221 K X |
| 3,350,119 | 10/1967 | Friedenreich et al............... | 403/348 |

Primary Examiner—Andrew V. Kundrat
Attorney, Agent, or Firm—Kane, Dalsimer, Kane, Sullivan and Kurucz

[57] ABSTRACT

A shaft attachment assembly for fastening a member to a shaft. The shaft has a receptacle end which includes an axial opening therein. A stud is provided for engagement with the receptacle end and has a body portion and a head portion. One of the stud and the receptacle end has surfaces forming a tapered cam surface terminating in a locking detent and the other of the stud and receptacle end has a transverse pin extending laterally therefrom. The member to be fastened to the shaft has an axial passageway therethrough positioned so that when the member is aligned with the receptacle end of the shaft, the passageway and the member will be aligned with the opening of the shaft. The body portion of the stud is extendable through the passageway and the member and the opening in the shaft to bring the pin into rotatable engagement with the cam surface. A resilient tension element is on the assembly to permit relative axial movement as the stud is rotated and the pin follows the cam surface to the locking detent thereby rigidly fastening the member to the stud. The resilient tension element also permits relative axial movement as the stud is rotated and the pin follows the cam slot from the locking detent to the disengaged position where the stud can be removed and the member and the shaft disengaged.

6 Claims, 6 Drawing Figures

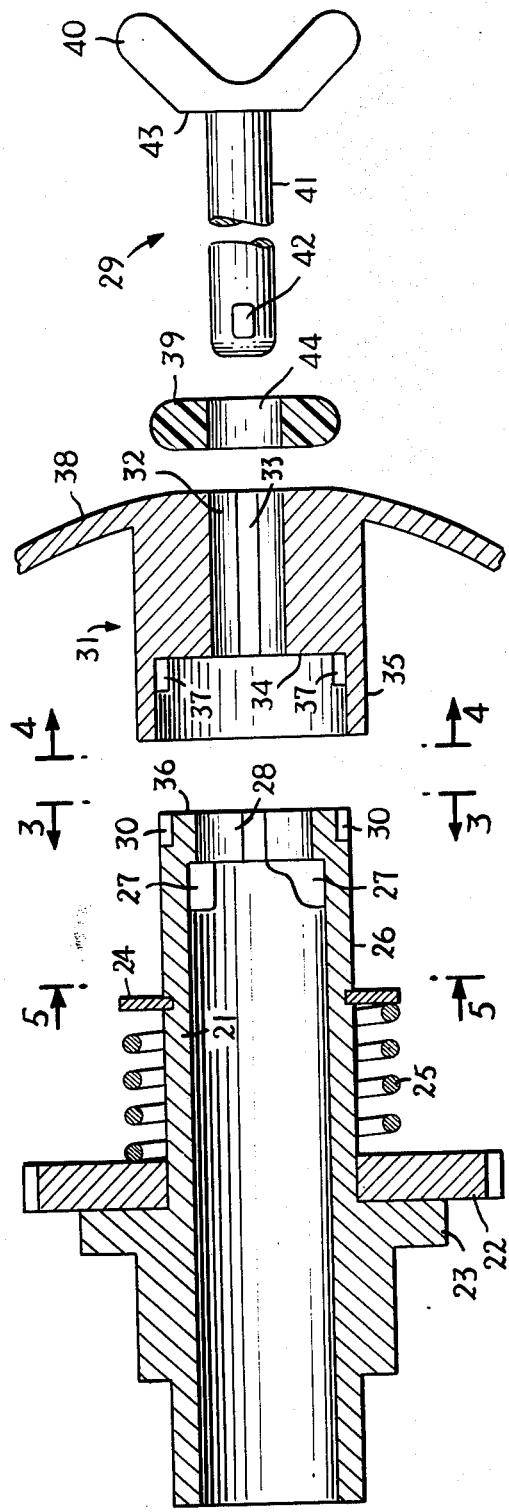
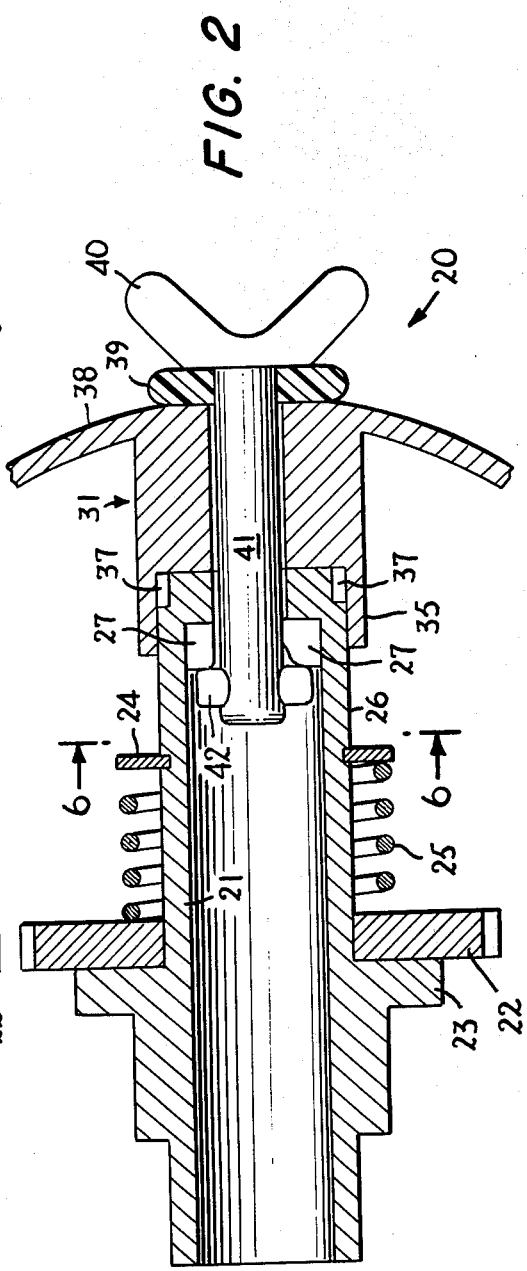
FIG. 1
FIG. 2

SHAFT ATTACHMENT ASSEMBLY

BACKGROUND OF THE INVENTION

It is common for shaft assemblies to require an interconnection between the end of the shaft and another member such as a wheel. There are numerous ways to interconnect the wheel to the shaft depending upon the environment and use. In certain applications, it is of value to have a fastener assembly which can be quickly locked and unlocked and unlocked to facilitate assembly and disassembly of the wheel and shaft. A common type of quarter-turn fastener arrangement is often utilized for this purpose. Most common types of quarter-turn fasteners require a receptacle assembly to be mounted in or on one of the members to be assembled and a stud be positioned in the other of the members so that interengagement of the stud and receptacle results in a locking of the two members together. Providing a separate receptacle part and stud part independent of the two members increases the cost of the fastener assembly, adds to the production time and the assembly time.

Consequently, it would be advantageous to have a quick release fastener assembly which does not require a separate receptacle element but includes the receptacle surfaces utilized for locking purposes on one of the members being fastened. It can be envisioned how assembly and production cost can be reduced in this manner. It should also be kept in mind that the fastener should be of a positive locking type particularly where parts are to be rotated after assembly such as in a wheel and shaft interengagement.

SUMMARY OF THE INVENTION

With the above background in mind, it is among the primary objectives of the present invention to provide a shaft attachment assembly for use in environment such as attaching a wheel to a shaft wherein the receptacle portion of a quick release fastener assembly is integrally positioned in the shaft end in position for interengagement with a stud passed through a wheel to thereby attach the wheel to the shaft. The assembly is designed so that the locking and unlocking functions can be accomplished through minimum rotation of the stud, for example, a quarter turn. To facilitate movement of the stud along the required path for locking and unlocking purposes, a resilient member such as a washer is applied to the assembly to act as the necessary resilient tension member. The resultant fastener provides for a rigid interlock between the shaft and the other member and is designed for low cost and efficient use. The receptacle is molded as part of the shaft so that a separate receptacle fastener element is not required.

In summary, a shaft attachment assembly for fastening a member to a shaft. The shaft has a receptacle end which includes an axial opening therein. A stud is provided for engagement with the receptacle end and has a body portion and a head portion. One of the stud and the receptacle end has surfaces forming a tapered cam surface terminating in a locking detent and the other of the stud and receptacle end has a transverse pin extending laterally therefrom. The member to be fastened to the shaft has an axial passageway therethrough positioned so that when the member is aligned with the receptacle end of the shaft, the passageway and the member will be aligned with the opening of the shaft. The body portion of the stud is extendable through the passageway and the member and the opening in the shaft to bring the pin into rotatable engagement with the cam surface. A resilient tension element is on the assembly to permit relative axial movement as the stud is rotated and the pin follows the cam surface to the locking detent thereby rigidly fastening the member to the stud. The resilient tension element also permits relative axial movement as the stud is rotated and the pin follows the cam slot from the locking detent to the disengaged position where the stud can be removed and the member and the shaft disengaged.

With the above objectives, among others, in mind reference is had to the attached drawings.

BRIEF DESCRIPTION OF THE DRAWINGS

In the drawings:

FIG. 1 is an exploded sectional view of the shaft attachment assembly of the invention;

FIG. 2 is a sectional view thereof in assembled condition;

DESCRIPTION OF THE PREFERRED EMBODIMENT

Figure 3:
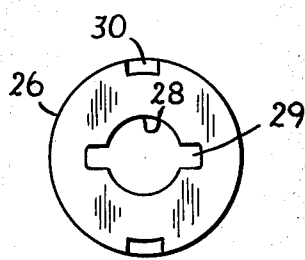
FIG. 3 is a sectional end view thereof taken along the plane of line 3—3 of FIG. 1.
Figure 4:
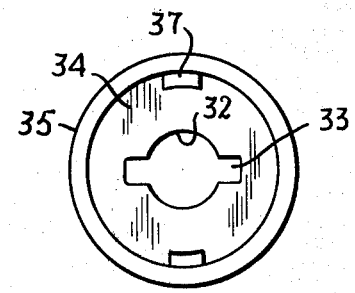
FIG. 4 is a sectional end view thereof taken along the plane of line 4—4 of FIG. 1.
Figure 5:
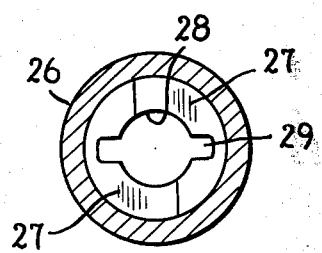
FIG. 5 is a sectional end view thereof taken along the plane of line 5—5 of FIG. 1.

The shaft attachment assembly 20 is shown in unconnected and interconnected form in FIGS. 1 and 2 respectively. As shown, hollow shaft 21 is journaled in a supporting structure 22 to permit its rotation with respect thereto. A flange 23 extends from the shaft on one side of supporting journal 22 and an annular ring or flange 24 is attached to the shaft on the other side of journal support 22 and is spaced therefrom so as to capture a compression spring 25. Spring 25 in compression acts to bear against ring or flange 24 at one end and the exposed surface of journal support structure 22 at the other end thereby tending to hold shaft 21 outwardly with respect to the supporting structure 22.

The annular ring or flange 24 is fixed in position on the shaft in any conventional manner such as by locating the ring in an annular notch about the circumference of shaft 21.

Naturally, the other end of shaft 21 can be attached to any common drive mechanism for purposes of rotating the shaft if desired in use. The terminal exposed end of the shaft forms a receptacle end 26. Shaft 21 may be of a plastic material or metal or other conventional material used in the desired environment. If plastic is employed, it is possible to mold a tapered cam surface 27 in the receptacle end with the cam surface terminating in a locking detent. The length of the cam surface and locking detent is predetermined and consists of two opposing segments as shown on diametrically opposed sides of the shaft. If metal is utilized, the cam surface can be machined in a conventional manner in the shaft surface. Cam surfaces 27 are integrally formed on the inner surface of hollow shaft 21. Access to the cam surfaces for locking purposes is achieved through central axial opening 28 in the end of shaft 21. Axial opening 28 is generally circular in configuration with the exception of two opposed lateral recesses 29 which combine with opening 28 to form a keyway for passage of portions of a stud 29. Opening 28 and the intercommunicating recesses 29 extend through the solid end portion of the shaft 21 to permit communication with the cam surfaces 27 on the interior sides of the shaft.

Aligned with recesses 29 are a pair of diametrically opposed notches 30 in the outer surface of the shaft receptacle end 26 for purposes of alignment between the members to be fastened so that a continuous keyway is provided through the components for passage of the stud.

Member 31 which is to be fastened to the shaft can be a wheel or any similar member which is designed for use in assembled condition with shaft 21. As shown, wheel 31 has a central opening 32 with appropriate opposed recesses 33 to facilitate passage of the stud. Opening 32 and recesses 33 correspond in configuration and size to opening 28 and recesses 29 of shaft 21. Additionally, opening 32 and recesses 33 in cooperation form a through axial passageway for the entire length of member 31 to permit communication between the upper surface of member 31 and the lower surface thereof.

Extending from lower surface 34 of member 31 is an annular skirt 35 which has an inner diameter large enough to permit reception of receptacle end 26 therein until the upper surface 36 of receptacle end 26 comes into engagement with the undersurface 34 of member 31.

For alignment purposes, a pair of opposed projections 37 extend inwardly from skirt 35 adjacent to undersurface 37 and are diametrically opposed so as to mate with notches 30 in the outer surface of shaft 21. Mating of projections 37 with notches 30 permits engagement between upper surface 36 of the shaft and undersurface 37 of the member and achieves proper alignment between opening 32 and opening 28. In the aligned position, recesses 33 are aligned with recesses 29 thereby providing a continuous keyway through member 31 and receptacle end 26 and communication between the upper surface 38 of member 31 and the cam surface 27 on the interior of shaft 21.

Stud 29 and resilient washer 39 complete assembly 20 and are the only portions of the assembly independent of the shaft and member 31. Stud 29 includes a head portion 40 and a cylindrical body portion 41 extending from head. Adjacent the end of body 41 remote from head 40 is a cross pin 42. The cross pin may be a pair of projecting diametrically opposed prongs as shown or it may be an alternative arrangement a through pin extending diametrically through an opening in body 41 so that it extends laterally from diametrically opposed points on the circumference of body 41. Pin 42 extends laterally from body 41 on both sides of the body a distance which is less than the diameter of the undersurface 43 of head 41. Additionally, it should be noted that the projections forming pin 42 correspond to recesses 33 in member 31 and recesses 29 in shaft 21.

Head 40 is shown with a pair of wings extending upwardly therefrom to facilitate grasping of the stud and rotation thereof so as to lock and unlock assembly 20 as desired. Alternatively, head 40 can be formed with any other desirable configuration such as with a slot for engagement with a tool for rotation purposes as long as undersurface 43 of head 40 forms a bearing surface for the locking function.

Washer 39 is a resilient tension member which may be of any well known conventional material such as rubber or plastic. The washer must be compressible and returnable to substantially its initial configuration to accommodate axial movement of the interconncted components during the unlocking and locking functions. Washer 39 has a central opening 44 which is large enough to accommodate cylindrical body 41 and extending pins 42 but is smaller than undersurface 43 of head 40. In this manner, the stud can be positioned through the washer with the exception of head 40 and may then be engaged with member 31 and shaft 21 for fastening purposes.

Stud 29 and member 31 can be of a plastic or metal material similar to shaft 21 and if plastic can be of a conventional molded design of low cost construction. Naturally, there is an additional cost saving in that no individual receptacle member is required for attachment to shaft 21. The receptacle surfaces are part of the shaft so that the only independent members other than the member to be fastened 31 are stud 29 and washer 39.

Stud 29 and member 31 can be of a plastic or metal material similar to shat 21 and if plastic can be of a conventional molded design of low cost construction. Naturally, there is an additional cost saving in that no individual receptacle member is required for attachment to shaft 21. The receptacle surfaces are part of the shaft so that the only independent members other than the member to be fastened 31 are stud 29 and washer 39.

In operation, member or wheel 31 is positioned over stud 21 so that skirt 35 extends over the outer surface of receptacle end 26. During this interengaging operation, the member 31 is rotationally moved until prongs 37 are seated in notches 30 thereby providing for alignment of the axial openings through member 31 and shaft 21. The appropriate keyways is then provided for body 41 and extending pins 42 of stud 29. Washer 39 is then aligned with the axial openings in member 31 and shaft 21 and stud 29 is inserted through the washer and the aligned keyways in member 31 and shaft 21 until undersurface 43 bears against the upper surface of washer 39 and the undersurface of washer 39 bears against the upper surface 38 of member 31. In this position, pins or projections 42 are in position for interengagement with tapered cam slots 27 on the interior of stud 21. Head 40 is then grasped by the extending wings and rotated so that pins 42 follow cam surface 27 into a locking detent. This action tends to draw member 31 into tight interengagement with the shaft and the axial movement is absorbed by compression of resilient washer 39. Cam surfaces and locking detent 27 is of a conventional nature such as a spiral configuration passing over a rise and terminating in a terminal recess. A conventional quarter-turn slot can be employed for this purpose so that complete travel of pins 42 in cam slot 27 can be accomplished through a quarter-turn rotation of stud 29. The spiral nature of the cam slot and the rise before the detent results in axial shifting of the respective members which is absorbed, as stated above, by resilient washer 39 so that the relative movement between components can be properly achieved.

Figure 6:
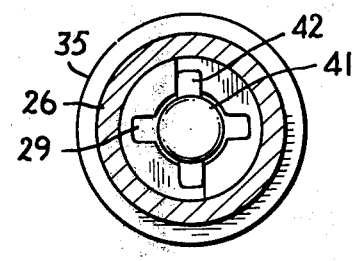
FIG. 6 is a sectional end view thereof taken along the plane of line 6—6 of FIG. 2.

When finally positioned in the locked position as shown in FIGS. 2 and 6, member 31 is rigidly interengaged with shaft 21. For unfastening procedures, head 40 is grasped and rotated a quarter-turn in the opposite direction thereby unseating pin 42 from the locking detent and transferring the pins downwardly along the cam surface 27 until pins 42 are in disengaged position with respect to the cam slots 27. Once again, axial movement of the respective members in the unlocking procedure is facilitated by the resilient nature of washer 39. Once stud 29 is free of cam slots 27, it can then be removed through the aligned keyways in shaft 21 and member 31 and through opening 44 in washer 39 thereby permitting member 31 and shaft 21 to be disassembled. Reassembly can be accomplished in the manner described above if desired thereafter.

It is readily apparent how modification in design can be accomplished. For example, the pin can be mounted in the receptacle and the cam slot positioned in the end of the body of the stud.

Thus, the above objectives, among others, are effectively attained.

What is claimed is:

1. A shaft attachment assembly for fastening a member to a shaft comprising:
    a shaft having a receptacle end with an axial opening therein;
    a stud for engagement with the receptacle end and having a body portion and a head portion;
    one of the receptacle end and the body portion having surfaces forming a tapered cam surface terminating in a locking detent and the other of the receptacle end and the body portion having a transverse pin extending laterally therefrom;
    the member to be fastened to the shaft having an axial passageway therethrough positioned so that when the member is aligned with the receptacle end of the shaft, the passageway in the member will be aligned with the opening in the shaft;
    the body portion of the stud being extendable through the passageway in the member and the opening in the shaft to bring the pin into rotatable engagement with the cam surface;
    a resilient tension element on said assembly to permit relative axial movement as the stud is rotated and the pin follows the cam surface to the locking detent thereby rigidly fastening the member to the stud and to permit relative axial movement as the stud is rotated and the pin follows the cam slot from the locking detent to a disengaged position where the stud can be removed and the member and shaft disengaged; and
    the member being a wheel and the shaft being journaled on a supporting structure, an annular flange extending from the shaft and being parallel to the surface on the supporting structure, a compression spring about the shaft and restrained between the flange and the supporting surface of the supporting structure and tending to direct the receptacle end of the shaft away from the supporting structure to facilitate its reception of the wheel and stud for fastening purposes.

2. A shaft attachment assembly for fastening a member to a shaft comprising:
    a shaft having a receptacle end;
    the receptacle end having an axial opening therein and surfaces communicating with the opening forming a tapered cam surface terminating in a locking detent;
    the member to be fastened to the shaft having an axial passageway therethrough positioned so that when the member is aligned with the receptacle end of the shaft, the passageway in the member will be aligned with the opening in the shaft;
    a stud having a body portion and a head portion and a transverse pin extending laterally from the body portion;
    the body portion and pin of the stud being extendable through the passageway in the member and the opening in the shaft to bring the pin into rotatable engagement with the cam surface;
    a resilient tension element on said assembly to permit relative axial movement as the stud is rotated and the pin follows the cam surface to the locking detent thereby rigidly fastening the member to the stud and to permit relative axial movement as the stud is rotated and the pin follows the cam slot from the locking detent to a disengaged position where the stud can be removed and the member and the shaft disengaged; and
    the member being a wheel and the shaft being journaled on a supporting structure, an annular flange extending from the shaft and being parallel to the surface on the supporting structure, a compression spring about the shaft and restrained between the flange and the supporting surface of the supporting structure and tending to direct the receptacle end of the shaft away from the supporting structure to facilitate its reception of the wheel and stud for fastening purposes.

3. A shaft attachment assembly for fastening a member to a shaft comprising:
    an elongated shaft having a receptacle end with an axial end opening therein and a stud receiving surface formed integrally therein to provide a one-piece shaft and receptacle;
    a stud for engagement with the receptacle end and having a body portion and a head portion;
    one of the receptacle end including the stud receiving surface and the body portion having surfaces forming a tapered cam surface terminating in a locking detent and the other of the receptacle end including the stud receiving surface and the body portion having a transverse pin extending laterally therefrom;
    the member to be fastened to the shaft having an axial passageway therethrough positioned so that when the member is aligned with the receptacle end of the shaft, the passageway in the member will be aligned with the opening in the shaft;
    the body portion of the stud being extendable through the passageway in the member and the opening in the shaft to bring the pin into rotatable engagement with the cam surface;
    a resilient tension element on said assembly to permit relative axial movement as the stud is rotated and the pin follows the cam surface to the locking detent thereby rigidly fastening the member to the stud and to permit relative axial movement as the stud is rotated and the pin follows the cam slot from the locking detent to a disengaged position where the stud can be removed and the member and shaft disengaged; and
    the member having a downwardly extending skirt adapted to surround the outer surface of the receptacle end portion of the shaft so as to facilitate alignment of the member and the shaft for fastening purposes.

4. The invention in accordance with claim 3 wherein a pair of opposed lateral projections extend inwardly from the surface of the skirt of the member and a pair of corresponding recesses are positioned on the outer surface of the shaft so that when the member and shaft are engaged alignment of the projections with the recesses will facilitate alignment of the member with respect to the shaft for reception of the stud.

5. A shaft attachment assembly for fastening a member to a shaft comprising:

an elongated shaft having a receptacle end;

the receptacle end having an axial end opening therein and stud receiving surfaces communicating with the opening forming a tapered cam surface terminating in a locking detent formed integrally therein to provide a one-piece shaft and receptacle;

the member to be fastened to the shaft having an axial passageway therethrough positioned so that when the member is aligned with the receptacle end of the shaft, the passageway in the member will be aligned with the opening in the shaft;

a stud having a body portion and a head portion and a transverse pin extending laterally from the body portion;

the body portion and pin of the stud being extendable through the passageway in the member and the opening in the shaft to bring the pin into rotatable engagement with the cam surface;

a resilient tension element on said assembly to permit relative axial movement as the stud is rotated and the pin follows the cam surface to the locking detent thereby rigidly fastening the member to the stud and to permit relative axial movement as the stud is rotated and the pin follows the cam slot from the locking detent to a disengaged position where the stud can be removed and the member and the shaft disengaged; and the member having a downwardly extending skirt adapted to surround the outer surface of the receptacle end portion of the shaft so as to facilitate alignment of the member and the shaft for fastening purposes.

6. The invention in accordance with claim 5 wherein a pair of opposed lateral projections extend inwardly from the surface of the skirt of the member and a pair of corresponding recesses are positioned on the outer surface of the shaft so that when the member and shaft are engaged alignment of the projections with the recesses will facilitate alignment of the member with respect to the shaft for reception of the stud.

* * * * *